United States Patent
Milojicic et al.

(10) Patent No.: US 10,528,752 B2
(45) Date of Patent: Jan. 7, 2020

(54) NON-VOLATILE STORAGE OF MANAGEMENT DATA

(71) Applicant: Hewlett Packard Enterprise Development LP, Houston, TX (US)

(72) Inventors: Dejan S. Milojicic, Palo Alto, CA (US); Chris I. Dalton, Bristol (GB); Zhikui Wang, Fremont, CA (US); Chandrasekar Venkatraman, Saratoga, CA (US); Adrian Shaw, Bristol (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 276 days.

(21) Appl. No.: 15/502,661

(22) PCT Filed: Aug. 13, 2014

(86) PCT No.: PCT/US2014/050950
§ 371 (c)(1),
(2) Date: Feb. 8, 2017

(87) PCT Pub. No.: WO2016/024969
PCT Pub. Date: Feb. 18, 2016

(65) Prior Publication Data
US 2017/0228555 A1 Aug. 10, 2017

(51) Int. Cl.
*G06F 12/16* (2006.01)
*G06F 21/62* (2013.01)
(Continued)

(52) U.S. Cl.
CPC ............ *G06F 21/6218* (2013.01); *G06F 8/65* (2013.01); *G06F 12/1408* (2013.01);
(Continued)

(58) Field of Classification Search
USPC ........................................................ 726/27
See application file for complete search history.

(56) References Cited

U.S. PATENT DOCUMENTS

| 6,243,814 B1 | 6/2001 | Matena |
| 6,775,778 B1 * | 8/2004 | Laczko, Sr. ............. G06F 21/51 380/2 |

(Continued)

OTHER PUBLICATIONS

International Searching Authority, The International Search Report and the Written Opinion, PCT/US2014/050950, dated Apr 13, 2015, 12 Pgs.

(Continued)

*Primary Examiner* — Amare F Tabor
(74) *Attorney, Agent, or Firm* — Hewlett Packard Enterprise Patent Department (57) ABSTRACT

Example implementations relate to non-volatile storage of management data. In example implementations, a system is disclosed, the system including a plurality of computing devices, a management device, and a non-volatile memory including a plurality of management spaces corresponding to the plurality of computing devices. In example implementations, at least one of the plurality of management spaces is to be accessible by the management device and by the corresponding computing device, be inaccessible by computing devices other than the corresponding computing device, and store management data associated with the corresponding computing device.

6 Claims, 4 Drawing Sheets

(51) Int. Cl.
*G06F 21/57* (2013.01)
*G06F 8/65* (2018.01)
*G06F 12/14* (2006.01)
*H04L 9/30* (2006.01)

(52) U.S. Cl.
CPC .............. *G06F 21/575* (2013.01); *H04L 9/30* (2013.01); *G06F 2212/402* (2013.01)

(56) References Cited

U.S. PATENT DOCUMENTS

| | | | |
|---|---|---|---|
| 7,289,334 B2 | 10/2007 | Behrens et al. | |
| 7,424,739 B2 * | 9/2008 | Pessach | H04L 63/20 380/231 |
| 7,716,291 B2 * | 5/2010 | Thorson | G06Q 20/085 705/50 |
| 8,078,687 B1 | 12/2011 | Galasso | |
| 8,078,869 B2 * | 12/2011 | Adams | G06F 21/6218 380/277 |
| 8,108,429 B2 | 1/2012 | Sim-Tang et al. | |
| 8,156,082 B2 | 4/2012 | Srivastava et al. | |
| 8,392,682 B2 * | 3/2013 | Dodgson | H04L 69/40 711/163 |
| 8,667,604 B2 * | 3/2014 | Karki | G06F 21/125 711/100 |
| 8,671,186 B2 | 3/2014 | Nagura et al. | |
| 8,812,872 B2 * | 8/2014 | Ogawa | G06F 12/1408 711/163 |
| 8,910,283 B1 * | 12/2014 | Gusarov | G06F 21/57 726/22 |
| 9,213,857 B2 * | 12/2015 | O'Hare | G06F 11/1076 |
| 2003/0069939 A1 | 4/2003 | Russell | |
| 2005/0050178 A1 | 3/2005 | Yamaguchi et al. | |
| 2005/0108582 A1 | 5/2005 | Fung | |
| 2006/0069758 A1 | 3/2006 | Hunt et al. | |
| 2009/0327741 A1 * | 12/2009 | Zimmer | G06F 21/575 713/183 |
| 2013/0290541 A1 | 10/2013 | Hatasaki et al. | |
| 2015/0139418 A1 * | 5/2015 | Nocera | H04L 9/30 380/44 |

OTHER PUBLICATIONS

Wang, C. et al.; Nvmalloc: Exposing an Aggregate SSD Store as a Memory Partition in Extreme-scale Machines; Oct. 15, 2011, 12 Pgs.

* cited by examiner

NON-VOLATILE STORAGE OF MANAGEMENT DATA

BACKGROUND

Computing devices may be managed remotely. Remote management may include booting the computing device, monitoring its state, changing its configuration settings, upgrading its firmware and software, and so forth. Types of remote management include "in-band" and "out-of-band" management, where in-band management relies on software and/or hardware to be installed and running on the managed device, while out-of-band management may also be performed on devices that are not operational (e.g., powered off, lacking the right software, being unable to communicate, and so forth) or if they are operational without interfering with their operation because the management may be executed by hardware different than the managed hardware.

BRIEF DESCRIPTION OF THE DRAWINGS

The following detailed description references the drawings, wherein.

DETAILED DESCRIPTION

As stated above, out-of-band management enables remote management of a computing device irrespective of whether or not the device is powered on and operational. Out-of-band management can be achieved, for example, by including in the computer device a management unit powered by an auxiliary power rail and auxiliary network connection, and having the management unit be powered on and operational even when the computer device is not. However, adding dedicated management units and additional power and network channels to each computing device can complicate system design and increase system cost and power consumption, particularly for multicomputer systems that include multiple computing devices.

Example implementations disclosed herein relate to non-volatile storage of management data. In example implementations, a system is provided that may include a plurality of computing devices, a management device, and a non-volatile memory including a plurality of management spaces corresponding to the plurality of computing devices. A management space may be configured to be accessible by the management device and by the corresponding devices, and be inaccessible by other computing devices. The management space may also be configured to store management data associated with the corresponding computing device.

Example implementations may also include a method, which may include obtaining, by a management device, a management request associated with a computing device that is powered off. The method may also include, based on a determination that the management request comprises a management query, retrieving management data corresponding to the management query from a management space in a non-volatile memory, where the management space may be associated with the computing device. The method may also include, based on a determination that the management request comprises a management update, updating management data in the management space based on the management update.

Example implementations may also include a computer-readable medium encoded with instructions which, when executed by a management device, may cause the management device to obtain a management request associated with a computing device; determine whether the computing device is powered on; if the computing device is powered on, process the management request by communicating with the computing device; and if the computing device is powered off, process the management request by accessing management data stored in a non-volatile memory at a management space associated with the computing device.

In this manner, example implementations disclosed herein simplify system design and reduce system's power consumption and cost. Additional implementations and advantages of such implementations will be apparent to those of skill in the art upon reading and understanding the following description.

Figure 1:
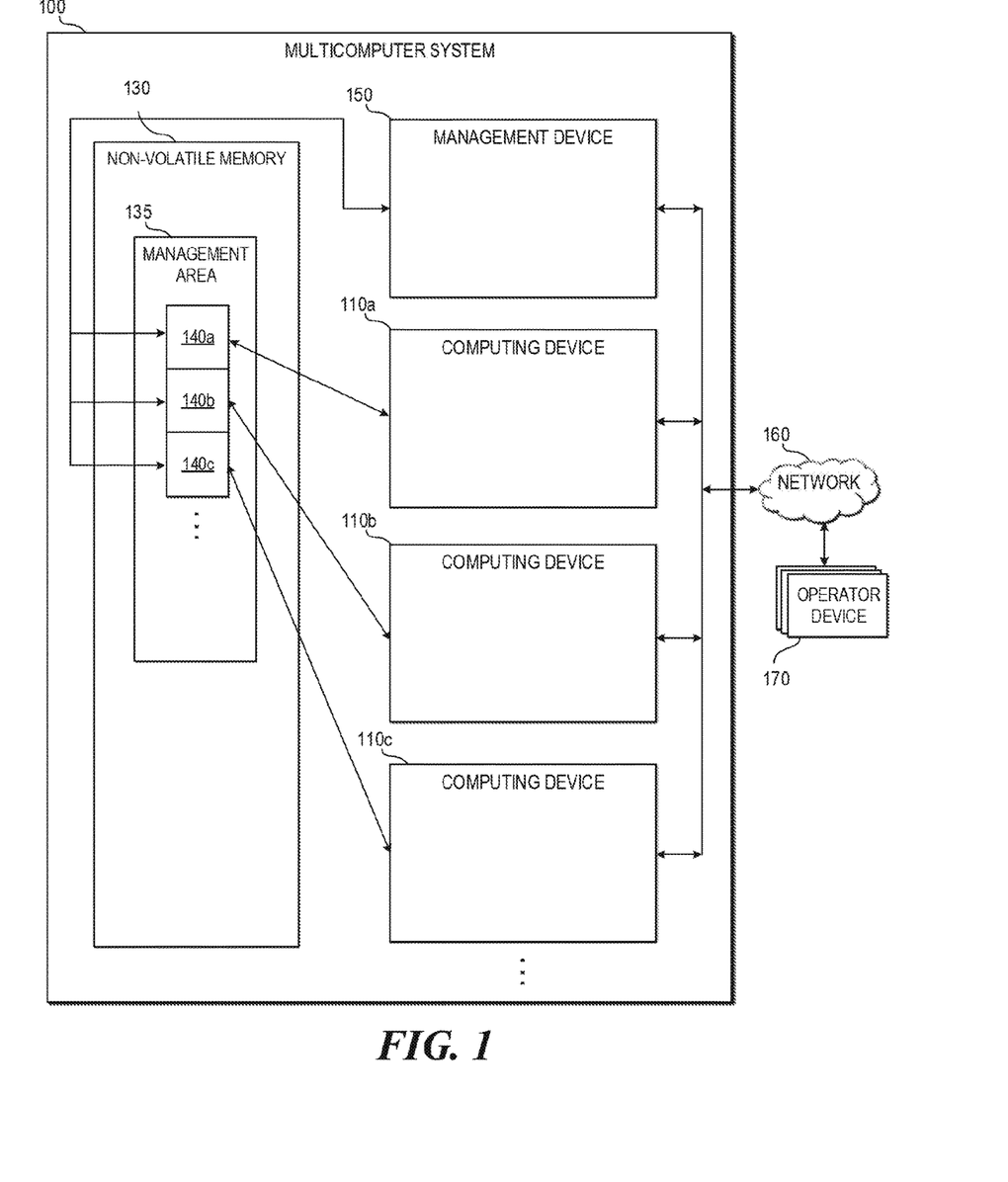
FIG. 1 is a block diagram of an example multicomputer system, consistent with implementations of the present disclosure.

Referring now to the drawings, FIG. 1 is a block diagram of an example multicomputer system 100. Multicomputer system 100 may be any system that includes, for example, a plurality of computing devices, such as computing devices 110a, 110b, and 110c (hereinafter, collectively or generally referred to as computing devices 110), a management device 150, and a non-volatile memory 130. For example, multicomputer system 100 may be a server rack including, among other things, a plurality of servers. In some implementations, not shown here for reasons of brevity, multicomputer system 100 may also include additional components providing computing devices 110 with power, cooling, networking, storage, management, interconnectivity, physical enclosure, and other shared services and resources.

Computing device 110 may include, for example, one or more electronic devices such as server computers, blade servers, desktop computers, notebook computers, tablet computing devices, mobile phones, or any other type of electronic devices. Different computing devices 110 within multicomputer system 100 may be devices of different types, may be configured for different types of applications, and may be owned and controlled by different and unrelated entities. As illustrated in FIG. 1, computing devices 110 may able to communicate with each other, with management device 150, and/or with other devices, such as operator device 170, for example, through networking or other approaches such as a shared memory fabric.

Management device 150 may include, for example, one or more electronic devices such as server computers, blade servers, desktop computers, notebook computers, tablet computing devices, mobile phones, or any other type of electronic devices. In some implementations, management device 150 may be one of computing devices 110 that has been designated or promoted to serve as a management device and perform management functions. In some implementations, management devices can be a virtual machine.

Network 160 may include one or more local-area networks (LANs), wide-area networks (WANs) such as the Internet, or any other types of network suitable for enabling communication between multicomputer system 100 and one or more operator devices 170. Operator device 170 can include one or more electronic devices such as server computers, blade servers, desktop computers, notebook computers, tablet computing devices, mobile phones, or any other type of electronic device suitable for communicating and exchanging data with multicomputer system 110 and its components via network 160.

Non-volatile memory 130 may include, for example, one or more persistent memory and/or storage devices that retain data when their electrical power is turned off. Thus, non-volatile memory 130 may include, for example, various types of Read-Only Memories (ROM), flash memories, memristor-based memories, storage drives, optical discs, and the like. In some implementations, non-volatile memory 130 may include a designated management area 135 having a plurality of dedicated management spaces 140 (e.g., management spaces 140a, 140b, and 140c) having predefined non-overlapping memory address ranges.

In some implementations, each management space 140 may be configured to correspond to one computing device 100 and to store management data of the corresponding computing device 100. For example, as illustrated in FIG. 1, management space 140a may store management data of computing device 110a; management space 140b may store management data of computing device 110b; and management space 140c may store management data of computing device 110c. While some examples discussed herein describe a one-to-one relationship between one management space 140 and one computing device 100, it will be appreciated that one-to-many and/or many-to-one relationships are also possible, without limitation. That is, in some implementations, one management space 140 may be configured to correspond to and be shared by two or more computing devices 100, and/or two or more management spaces 140 may be configured to correspond to one computing device 100.

Management data stored in management space 140 may include state information describing the current state of the corresponding computing device 110, such as its on/off state, power consumption, temperature, performance statistics, and the like. Management data may also include historical state information, and may include, for example, an error log showing any errors that have occurred in the corresponding computing device 110. Management data may also include inventory information describing the inventory of the corresponding computing device 110, such as what hardware (e.g., storage, memory, processor(s), etc.) is included and how much of it is currently available, or what software (e.g., operating system (OS), drivers, applications, etc.) is installed and running. Management data may also include identification information identifying the corresponding computing device 110, such as the device's media access control (MAC) address, Internet protocol (IP) address, serial number, and so forth.

In some implementations, management data may also include recovery and upgrade data, such as a latest image of the operating system, latest version of firmware, drivers, applications, etc. Recovery and upgrade data may be downloaded to (e.g., read by) the corresponding computing device 110 at boot time and/or periodically. In some implementations, management data may also include reconfiguration data, which may be downloaded to (e.g., read by) the corresponding computing device 110 at boot time, periodically, or asynchronously. This may enable reconfiguration of the corresponding computing device 110, such as turning the device off, enabling or disabling some of the device's hardware or software components, setting various parameters of the device, and so forth. It is appreciated by a person skilled in the art that in addition to the examples provided above, management data may include any other information that may be used for monitoring, controlling, upgrading, and otherwise managing the corresponding computing device 110.

Figure 2:
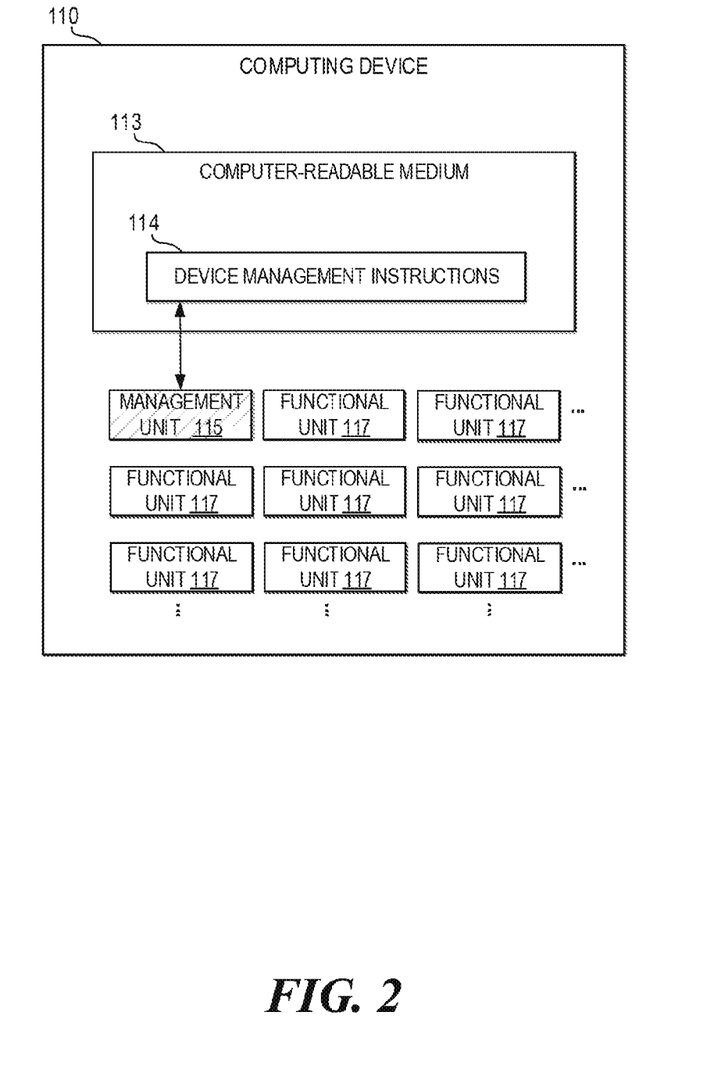
FIG. 2 is a block diagram of an example computing device, consistent with implementations of the present disclosure.

FIG. 2 shows a block diagram of an example computing device 110, in accordance with some implementations. Computing device 110 may include, among other things, one or more functional units 117, a management unit 115, and a computer-readable medium 113 storing device management instructions 114. In some implementations, management unit 115 may be one of functional units 117 that has been designated or promoted to serve as a management unit. Each functional unit 117 and management unit 115 may be a processor such as a central processing unit (CPU), a graphics processing unit (GPU), a microprocessor, and/or any other hardware device suitable for execution of instructions. In some implementations, functional units 117 and management unit 115 may be processor cores of one or more multi-core processors. In some implementations (not shown), computing device 110 may include only one unit (e.g., a processor) that may act as both management unit 115 and functional unit 117.

In some implementations, computing device 110 may run a device management application for updating management data in and retrieving data from the corresponding management space 140. In some implementations, the device management application may be run by management unit 115. While in some implementations computing device 110 may include only one management unit 115, it is appreciated that in other implementations computing device 110 may include a plurality of management units 115, in which case the management application may be run by the plurality of management units 115. In some implementations, the device management application may be implemented in software, in hardware, or in any combination thereof. For example, in some implementations, to run the device management application, management unit 115 may fetch and execute device management instructions 114 stored, for example, in computer-readable medium 113. Computer-readable medium 113 may be, for example, a non-transitory storage implemented as volatile storage (e.g., RAM), as non-volatile storage (e.g., a hard disk drive, an optical storage, a solid-state storage, a memristor-based storage, etc.) or as any combination thereof. In some implementations, device management instructions 114 may not be stored on computing device 110. For example, in some implementations, device management instructions 114 may be stored in non-volatile memory 130 of multicomputer system 100.

Device management instructions 114, when executed by management unit 115, may cause computing device 110 to update the management data in the corresponding management space 140. For example, computing device 110 may update the management data periodically, for example, every 5 minutes. Computing device 110 may also update the management data when computing device 110 detects that any portion of its management data (e.g., state information, inventory information, identification information, etc.) has changed. Thus, computing device 110 may ensure that the management data is synchronized and properly reflects the current or the most recent state, configuration, etc., of computing device 110.

Device management instructions 114 may also cause computing device 110 to read, from the corresponding management space 140, updated management data, such as recovery and upgrade data, reconfiguration data, etc. For example, computing device 110 may read updated management data every time computing device 110 is booted, and/or periodically. After obtaining the updated management data, computing device 110 may update its firmware, software, configuration, etc., based on the updated management data.

Device management instructions 114 may also cause computing device 110 to receive, process, and respond to management requests from management device 150 and/or operator device 170, as discussed in more detail below.

Figure 3:
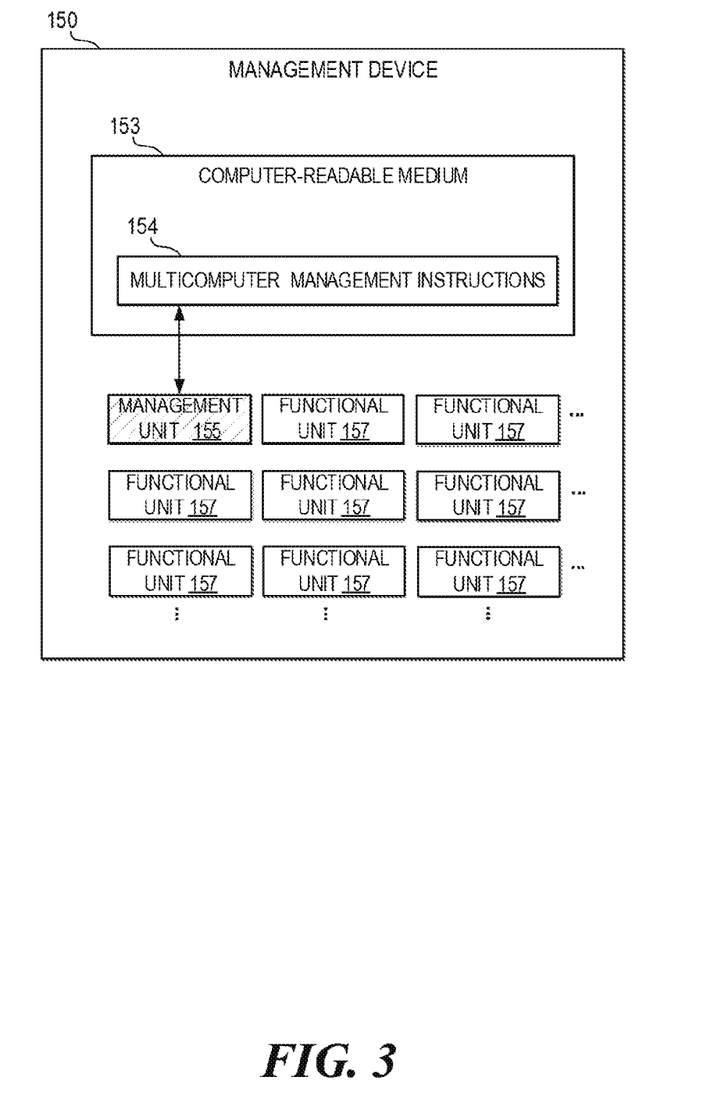
FIG. 3 is a block diagram of an example management device, consistent with implementations of the present disclosure.

FIG. 3 shows a block diagram of an example management device 150, in accordance with some implementations. Management device 150 may include, among other things, one or more functional units 157, a management unit 155, and a computer-readable medium 153 storing multicomputer management instructions 154. In some implementations, management unit 155 may be one of functional units 157 that has been designated or promoted to serve as a management unit. Each functional unit 157 and management unit 155 may be a processor such as a central processing unit (CPU), a graphics processing unit (GPU), a microprocessor, and/or any other hardware device suitable far execution of instructions. In some implementations, functional units 157 and management unit 155 may be parts of the same mufti-core processor.

As discussed above, in some implementations, management device 150 may be one of computing devices 110 that has been designated as or promoted to serve as a management device. Thus, in some implementations, computer-readable medium 153, management unit 155, and functional units 157, may be implemented as computer-readable medium 113, management unit 115, and functional units 117, respectively.

In some implementations, management device 150 may run a multicomputer management application for updating and retrieving management data corresponding to any computing device 110. In some implementations, the multicomputer management application may be run by management unit 155. While in some implementations management device 150 may include only one management unit 155, it is appreciated that in other implementations management device 150 may include a plurality of management units 155, in which case the multicomputer management application may be run by the plurality of management units 155. In some implementations, the multicomputer management application may be implemented in software, in hardware, or in any combination thereof. For example, in some implementations, to run the multicomputer management application, management unit 155 may fetch and execute multicomputer management instructions 154 stored in computer-readable medium 153. Computer-readable medium 153 may be, for example, a non-transitory storage implemented as volatile storage (e.g., RAM), non-volatile storage (e.g., a hard disk drive, an optical storage, a solid-state storage, a memristor-based storage, etc.) or any combination thereof. In some implementations, multicomputer management instructions 154 may not be stored on management device 150. For example, in some implementations, multicomputer management instructions 154 may be stored in non-volatile memory 130 of multicomputer system 100.

Figure 4:
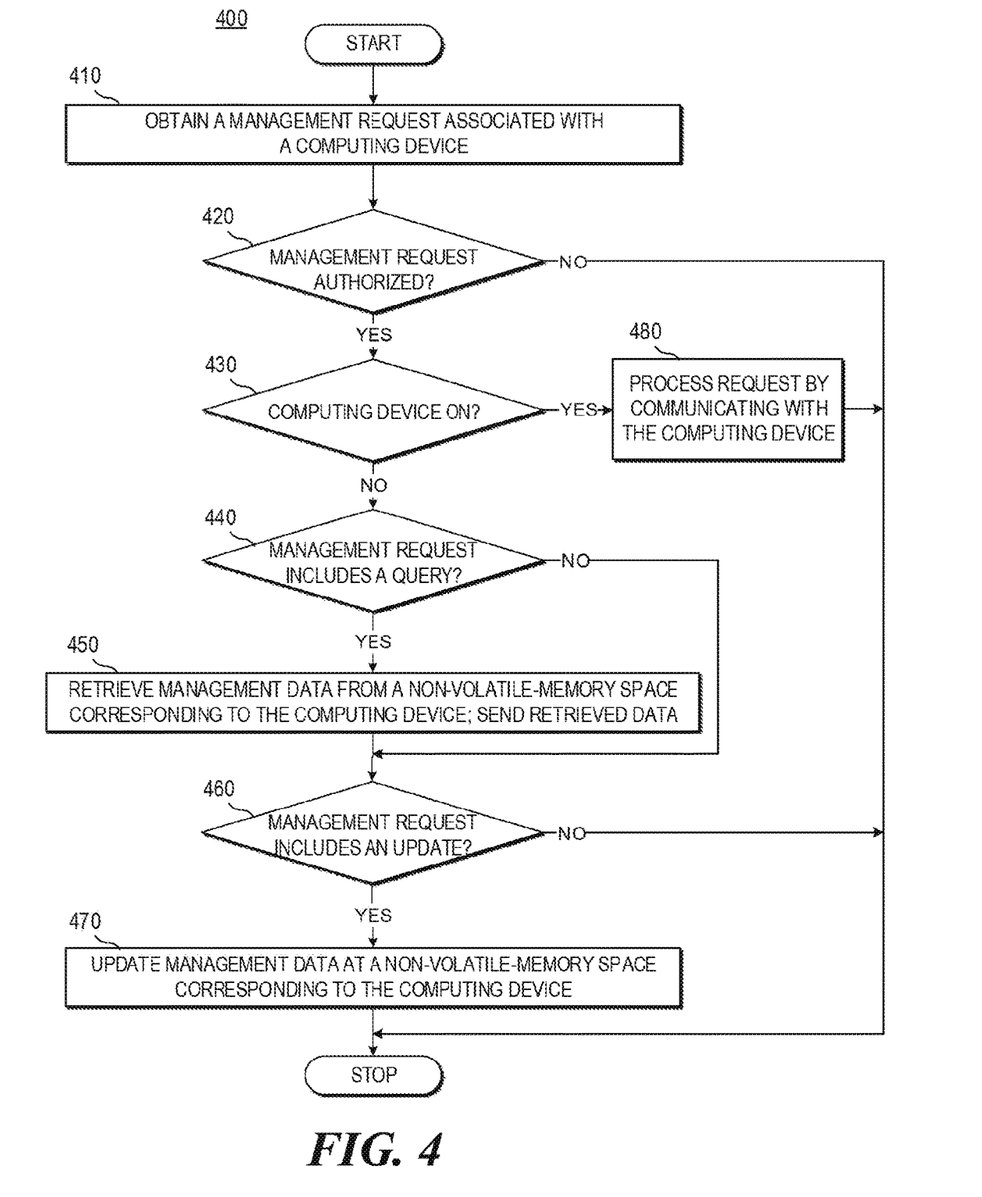
FIG. 4 is a flowchart of an example method for processing management requests, consistent with implementations of the present disclosure.

Multicomputer management instructions 154, when executed by management unit 155 may cause management unit 155 to perform a method 400 for processing management requests, an example of which is illustrated in a flowchart of FIG. 4. While the flowchart discloses various blocks in a particular order, it is appreciated that at least some of the blocks may be moved, modified, or deleted where appropriate, consistent with the teachings of the present disclosure. As discussed above, method 400 may be implemented in the form of instructions, such as state data update instructions 154, which may be stored on a computer-readable medium, such as computer-readable medium 153, and executable by a processor, such as management unit 155. Alternatively or in addition, method 400 may be implemented in part or in its entirety in the form of electronic circuitry.

At block 410, the method may obtain a management request associated with one of computing devices 110. In some implementations, the management request may be received via network 160 from one of operator devices 170. In some implementations, the management request may be obtained from a predefined management event scheduled to occur at a given time. A management request may include one or more management queries and/or one or more management updates. Management queries may include, for example, requests to receive current management data, such as state information, historic state information, inventory information, identification information, and so forth. Management updates may include, for example, requests to update current management data, such as reconfiguration data, recovery and upgrade data, and so forth. While for illustration purposes method 400 is described as processing one management request associated with one computing device 110, it is appreciated by a person skilled in the art that method 400 may similarly process any number of management requests, where each request may be associated with one or more computing devices 110.

At block 420, the method may determine whether the management request is authorized. For example, the method may determine whether the requesting device (e.g., one of operator devices 170) and/or its user is authorized to manage the computing device 110 associated with the management request. In some implementations, the authorization may be performed based on authentication data (e.g., username and password), which may be provided by the requesting device (e.g., one of operator devices 170). If the method determines at block 420 that the management request is authorized, the method may proceed to block 430; otherwise, the method may send an error message to the requester and then end.

At block 430, the method may determine whether or not the computing device 110 associated with the management request is powered on. In some implementations, in addition to determining whether the device is powered on, the method may also check whether the device is operational, for example, whether it is running a functional OS and is able to communicate. If the device is determined to be powered on and operational, the method may proceed to block 480; otherwise, the method may proceed to block 440.

As will be discussed in more detail below, in some implementations, if the computing device 110 associated with the management request is determined to be powered on and operational, the method may proceed to either block 480 or block 440. Thus, in some implementations, the method may proceed from block 420 to block 440, and manage the computing device 110 using its corresponding management space 140, irrespective of whether or not the computing device 110 is powered on and operational.

At block 440, the method may determine whether the management request includes at least one management query, e.g., at least one request to receive management data associated with or corresponding to the computing device 110. If the management request includes at least one management query, the method may proceed to block 450; otherwise, the method may proceed to block 460.

At block 450, the method may retrieve (e.g., read) the requested management data from management space 140 that corresponds to the computing device 110 associated with the management request. For example, if the management request is associated with computing device 110b (e.g., the management request requests management data corresponding to computing device 110b), the method may retrieve the requested management data from management space 140b. After retrieving the requested management data, the method may send the retrieved management data to the requester (e.g., to operator device 170 via network 160) or to another device, and/or store the retrieved management data, for example, in computer-readable medium 153.

At block 460, the method may determine whether the management request includes at least one management update, e.g., at least one request to update management data associated with or corresponding to the computing device 110. If the management request includes at least one management update, the method may proceed to block 470; otherwise, the method may end.

At block 470, the method may update, based on the management request, management data in management space 140 that corresponds to the computing device 110 associated with the management request. For example, if the management request is associated with computing device 110b (e.g., the management request requests to update management data corresponding to computing device 110b), the method may update the management data in management space 140b in accordance with the request. In some implementations, after updating the management data, the method may send to the requester (e.g., to operator device 170 via network 160) an indication of whether or not the update has been completed successfully.

Referring now to block 430, as mentioned above, if it is determined that the computing device 110 that is associated with the management request is powered on and operational, the method may, in some implementations, proceed to block 480. At block 480, the method may process the management request by communicating with the corresponding computing device 110, for example, through the device management application running on the corresponding computing device 110. Thus, the method may send the management request obtained at block 410 to the corresponding computing device 110. After receiving the management request, if the management request includes any management queries, the corresponding computing device 110 may first obtain the queried management data, for example, by determining the status of its software, hardware, and other components or parameters, or by retrieving the management data from the corresponding management space 140. In addition, if the management request includes any management updates, the corresponding computing device 110 may update its configuration, software, and other components and parameters, in accordance with the management update, and it may also update accordingly the management data stored in the corresponding management space 140. After block 480, the method may end.

In some implementations, instead or in addition to managing computing devices 110 through management device 150, operator device 170 may manage each computing device 110 directly, provided that the device is powered on and operational. For example, as discussed above, computing device 110 may be configured to receive management requests directly from one of operator devices 170 via network 160, and then authenticate, process, and respond to these requests in a manner similar to that described in connection with block 480.

In some implementations, management device 150 itself may be managed similarly to how computing devices 110 are managed. For example, while not shown in FIG. 1, it is appreciated that management area 135 may also include a management space 140 dedicated for storing management data for management device 150.

It is appreciated from the above discussion that management device 150 may be configured to access any management space 140 in management area 135, that is, it may access management spaces 140 corresponding to any or all computing devices 110. This enables management device 150 to manage any computing device 110, irrespective of whether or not the computing device 110 is powered on and operational.

For security and privacy reasons, each computing device 110, when powered on and operational may access only one management space 140 (the management space 140 that correspond to that computing device 110) and it may be restricted from accessing any other management spaces 140. In some implementations, for increased performance, computing device 110 may access the corresponding management space 140 through a high-bandwidth low-latency connection, e.g., through optical fibers.

In some implementations, computing device 110 may store an initialization firmware. The initialization firmware may be stored, for example, on read-only-memory (ROM) firmware, or on a flash memory, in which case the initialization firmware may be verified as being authentic during the secure boot protocol of computing device 110. In some implementations, the initialization firmware, when executed by computing device 110, may cause computing device 110 to configure a memory controller of computing device 110 to decode a predefined internal address range (e.g., a range associated with management data) to an external address range of or associated with the corresponding management space 140 in non-volatile memory 130. Thus, the initialization firmware of different computing device 110 may map the internal address range associated with management data to a different external address range. The external address range mapped to the internal address range may either be the address range of the corresponding management space 140 or an address range that would be further remapped to the address range of the corresponding management space 140 by another memory controller, e.g., memory controller external to computing device 110. Instead of or in addition to having the initialization firmware, in some implementations, when computing device 110 boots it may automatically access a predefined address range in non-volatile memory 130 that may include initialization code, and execute that initialization code.

To further ensure that a particular management space 140 may only be accessed by one corresponding computing device 110 and by management device 150, and not by any other computing device 110 or any other device, in some implementations, management data may be encrypted. For example, management data may be encrypted using public-key cryptography or any other suitable encryption method.

In some implementations, management device 150 and computing devices 110 may each have a unique private key, which may, for example, be embedded in the device and thus be inaccessible by other devices. Each private key may be associated with a public key, such that any information encrypted with the public key could be decrypted with the private key associated with the public key. The public keys may be stored on their respective computing devices 110, management device 150, non-volatile memory 130 or on other devices. In some implementations, management device 150 may have access to the public keys of each computing device 110 and each computing device 110 may have access to the public key of management device 150. By having access to each other's public keys, management device 150 and any given computing device 110 may encrypt the management data corresponding to that computing device 110 such that the management data may be decrypted only by management device 150 and that computing device 110, but not by any other computing device 110. For example, based on each other's public keys, management device 150 and a given computing device 110 may calculate a shared secret key (e.g., using the Diffie-Hellman method), and the shared secret key may be used by the two devices to encrypt management data stored in a management space 140 corresponding to the computing device 110.

In some implementations, the management functionality described above in connection to computer device 110 and management device 150 may be limited to management units 115 and 155, respectively. For example, in some implementations, functional units 117 and 157 may be restricted from accessing management spaces 140 and/or from accessing the private and public keys necessary for encrypting and decrypting the management data. In other implementations, however, functional units 117 and 157 may not be restricted from accessing management spaces 140 or the private and public keys. Thus, in some implementations, there may be no one designated management unit 115 or one designated management unit 155, and any functional units 117 or 157 may be enabled to perform the data management functionality described above.

According to the foregoing, example implementations disclosed herein enable secure access to management data of any computing device from a plurality of computing devices, whether or not the computing device is powered on and operational, without including in the computing device an additional always-on processor and/or additional power and networking lines.

What is claimed is:

1. A system comprising:
    a plurality of computing devices;
    a management device;
    a non-volatile memory comprising a plurality of management spaces corresponding to the plurality of computing devices, wherein at least one management space is to:
        be accessible by the management device and by the corresponding computing device,
        be inaccessible by computing devices other than the corresponding computing device,
        store management data associated with the corresponding computing devices; wherein:
    the management data is encrypted with a public key; and
    the corresponding computing device comprises a private key associated with the public key, wherein the private key is inaccessible by computing devices other than the corresponding computing device.

2. The system of claim 1, wherein the management data is to be accessible by the management device at least when the corresponding computing device is powered off or is not operational.

3. The system of claim 1, wherein the management data comprises state information indicating a current state of the corresponding computing device, and wherein the corresponding device is to:
    detect a change in the current state; and update the state information based on the change.

4. The system of claim 1, wherein:
    the management data comprises upgrade data;
    the corresponding device comprises at least one of a software component and a firmware component; and
    the corresponding device is to upgrade the at least one of the software component and the firmware component based on the upgrade data.

5. The system of claim 1, wherein the computing device comprises at least one management unit and at least one functional unit, and wherein the management space is to be accessible by the management unit and not to be accessible by the functional unit.

6. The system of claim 1, wherein the corresponding computing device comprises a memory controller configured to map an internal address range associated with the management space.

* * * * *